US008024187B2

(12) United States Patent
Teo et al.

(10) Patent No.: US 8,024,187 B2
(45) Date of Patent: Sep. 20, 2011

(54) PULSE ALLOCATING METHOD IN VOICE CODING

(75) Inventors: Chun Woei Teo, Singapore (SG); Sua Hong Neo, Singapore (SG); Koji Yoshida, Kanagawa (JP); Michiyo Goto, Tokyo (JP)

(73) Assignee: Panasonic Corporation, Osaka (JP)

( * ) Notice: Subject to any disclaimer, the term of this patent is extended or adjusted under 35 U.S.C. 154(b) by 1021 days.

(21) Appl. No.: 11/815,916

(22) PCT Filed: Feb. 9, 2006

(86) PCT No.: PCT/JP2006/302258

§ 371 (c)(1), (2), (4) Date: Aug. 9, 2007

(87) PCT Pub. No.: WO2006/085586

PCT Pub. Date: Aug. 17, 2006

(65) Prior Publication Data

US 2009/0043572 A1 Feb. 12, 2009

(30) Foreign Application Priority Data

Feb. 10, 2005 (JP) ................................ 2005-034984

(51) Int. Cl.
*G10L 15/00* (2006.01)

(52) U.S. Cl. ............. 704/239; 704/223; 381/1; 381/17; 381/18; 381/19

(58) Field of Classification Search .................. 704/239, 704/223; 381/1, 17–19
See application file for complete search history.

(56) References Cited

U.S. PATENT DOCUMENTS

| | | | | |
|---|---|---|---|---|
| 5,651,090 | A * | 7/1997 | Moriya et al. | 704/200.1 |
| 5,806,024 | A * | 9/1998 | Ozawa | 704/222 |
| 2004/0044524 | A1 | 3/2004 | Minde et al. | |
| 2006/0020450 | A1 * | 1/2006 | Miseki | 704/219 |

FOREIGN PATENT DOCUMENTS

| | | |
|---|---|---|
| JP | 2004-509365 | 3/2004 |
| WO | 02/23529 | 3/2002 |

OTHER PUBLICATIONS

Ebara et al., "Shosu Pulse Kudo Ongen o Mochiiru Tei Bit Rate Onsei Fugoka Hoshiki no Hinshitsu Kaizen," IEICE Technical Report [Speech], SP99-74, vol. 99, No. 299, pp. 15-21, Sep. 16, 1999.
"AMR Wideband Speech Codec; General Description", 3GPP TS 26.171, V5.0.0 (Mar. 2001).
"Wideband Coding of Speech at Around 16 kbit/s Using Adaptive Multi-Rate Wideband (AMR-WB)", Geneva, ITU-T Recommendation G.722.2 (Jul. 2003).

* cited by examiner

*Primary Examiner* — Jakieda Jackson
(74) *Attorney, Agent, or Firm* — Greenblum & Bernstein, P.L.C.

(57) ABSTRACT

A pulse allocating method capable of coding stereophonic voice signals efficiently. In the fixed code note retrievals of this pulse allocating method, for individual subframes, the stereophonic voice signals are compared to judge similarity between channels, and are judged on their characteristics. On the basis of the similarity between the channels and the characteristics of the stereophonic signals, the pulse numbers to be allocated to the individual channels are determined. Pulse retrievals are executed to determine the pulse positions for the individual channels, so that the pulses determined are coded.

6 Claims, 10 Drawing Sheets

| TRACK | PULSE POSITION | VALID PULSE POSITION IN SUBFRAME |
|---|---|---|
| 1 | $p_0,p_4,p_8,p_{12},p_{16},p_{20}$ | 0,4,8,12,16,20,24,28,32,36,40,44,48,52,56,60 |
| 2 | $p_1,p_5,p_9,p_{13},p_{17},p_{21}$ | 1,5,9,13,17,21,25,29,33,37,41,45,49,53,57,61 |
| 3 | $p_2,p_6,p_{10},p_{14},p_{18},p_{22}$ | 2,6,10,14,18,22,26,30,34,38,42,46,50,54,58,62 |
| 4 | $p_3,p_7,p_{11},p_{15},p_{19},p_{23}$ | 3,7,11,15,19,23,27,31,35,39,43,47,51,55,59,63 |

FIG.1

| TYPE | BIT 1 | BIT 2 | PULSE APPORTIONMENT |
|---|---|---|---|
| 0 | 0 | 0 | L CHANNEL/R CHANNEL : 24 PULSES |
| 1 | 0 | 1 | L CHANNEL : 12 PULSES, R CHANNEL : 12 PULSES |
| 2 | 1 | 0 | L CHANNEL : 8 PULSES, R CHANNEL : 16 PULSES |
| 3 | 1 | 1 | L CHANNEL : 16 PULSES, R CHANNEL : 8 PULSES |

FIG.7

| THE NUMBER OF PULSES | 3 BIT | 4 BIT | 5 BIT |
|---|---|---|---|
| 4 | 000 | 0000 | 00000 |
| 5 | | | 00001 |
| 6 | | 0001 | 00010 |
| 7 | | | 00011 |
| 8 | 001 | 0010 | 00100 |
| 9 | | | 00101 |
| 10 | | 0011 | 00110 |
| 11 | | | 00111 |
| 12 | 010 | 0100 | 01000 |
| 13 | | | 01001 |
| 14 | | 0101 | 01010 |
| 15 | | | 01011 |
| 16 | 011 | 0110 | 01100 |
| 17 | | | 01101 |
| 18 | | 0111 | 01110 |
| 19 | | | 01111 |
| 20 | 100 | 1000 | 10000 |

FIG.9

PULSE ALLOCATING METHOD IN VOICE CODING

TECHNICAL FIELD

The present invention relates to a pulse apportionment method in speech coding.

BACKGROUND ART

Typically, speech coding makes use of vocal tract modeling to reconstruct or synthesize the speech signal so that it resembles as close to the original as possible. Such speech coding includes adaptive multi rate wideband (AMR-WB) speech coding which is used in the 3GPP system (see Non-Patent Document 1). This AMR-WB speech coding was also selected and approved by the ITU-T as ITU-T recommendation G.722.2 (Non-Patent Document 2). Hereinafter, a case will be described as an example where AMR-WB speech coding at a bit rate of 23.85 kbit/s is used.

One of the important blocks of AMR-WB speech coding is a fixed codebook search (FIG. 1). In AMR-WB speech coding, each frame of two hundred and fifty six downsampled speech samples is divided into four subframes of sixty four samples each. During the fixed codebook search, the subframe is divided into four tracks. For mode 8 of AMR-WB speech coding, for each track, six pulse positions are selected from among the sixteen possible pulse positions in each track. That is, the number of pulses for each subframe is set to twenty four from $p_0$ to $p_{23}$. These twenty four pulse positions from $p_0$ to $p_{23}$ are encoded to form a codebook index which is used for synthesizing the speech for each subframe (see Non-Patent Document 1).

Presently, ITU-T recommendation G.722.2 supports AMR-WB speech coding for monaural signals, but does not support AMR-WB speech coding for stereo speech signals.

With development of a wide transmission band in mobile communication and IP communication and diversification of services in such communications, high speech quality and high-fidelity speech communication are demanded. For example, from now on, it is expected to increase demand of communication in a hands free video telephone service, speech communication in video conference, multi-point speech communication where a plurality of callers hold a conversation simultaneously at multiple locations and speech communication capable of transmitting the sound environment of the surroundings with high fidelity. In this case, it is desired to implement speech communication using stereo speech that has high fidelity compared to monaural signals and that makes it possible to identify the locations of a plurality of callers. To implement speech communication using stereo speech, coding of stereo speech signals is essential. Methods of coding stereo speech signals include independently coding a speech signal of each channel (dual-monaural coding).

Non-Patent Document 1: "AMR Wideband Speech Codec; General Description", 3GPP TS 26.171, V5.0.0 (2001-03)

Non-Patent Document 2: "Wideband Coding of Speech at Around 16 kbit/s Using Adaptive Multi-Rate Wideband (AMR-WB)", Geneva, ITU-T Recommendation G.722.2 (2003-07)

DISCLOSURE OF INVENTION

Problems to be Solved by the Invention

If the stereo speech signal is simply subjected to dual-monaural coding using AMR-WB speech coding, the above-described fixed codebook search has to be performed on the speech signal of each channel, which is not preferable in terms of coding efficiency and processing efficiency.

It is therefore an object of the present invention to provide a pulse apportionment method that enables efficient coding of stereo speech signals.

Means for Solving the Problem

The pulse apportionment method of the present invention is used in a fixed codebook search in speech coding for a stereo signal, and includes determining the number of pulses to be apportioned to channels of the stereo signal according to characteristics of the channels and similarity between the channels.

Advantageous Effect of the Invention

According to the present invention, it is possible to efficiently encode stereo speech signals.

BRIEF DESCRIPTION OF DRAWINGS

FIG. 1 shows a fixed codebook of AMR-WB speech coding;

FIG. 7 shows an example of reporting according to Embodiment 1 of the present invention;

FIG. 9 shows an example of reporting according to Embodiment 2 of the present invention.

BEST MODE FOR CARRYING OUT THE INVENTION

Embodiments of the present invention will be described in detail below with reference to the accompanying drawings. In the following description, AMR-WB speech coding will be described as an example. Further, in the following description, embodiments will be described using mode 8 out of AMR-WB speech coding modes, but the embodiments can be applied to other coding modes.

In mode 8 of AMR-WB speech coding, there are twenty four pulses in a fixed codebook vector (innovation vector). As shown in FIG. 1, in each subframe, there are sixty four possible pulse positions from 0 to 63, and these pulse positions are divided into four tracks from 1 to 4 so that each track contains six pulses.

Embodiment 1

In this embodiment, based on similarity of the input stereo signal between the channels and periodicity and the degree of stationarity of each channel, the number of pulses for each channel to be apportioned is determined, and the required number of pulses is apportioned to each channel. After the number of pulses to be apportioned to each channel is determined, a standard pulse search similar to AMR-WB speech coding is carried out to determine pulse positions for each channel. These pulses are encoded as a set of codewords and transmitted as a codebook index as one of the parameters in the speech bitstream.

Figure 2:
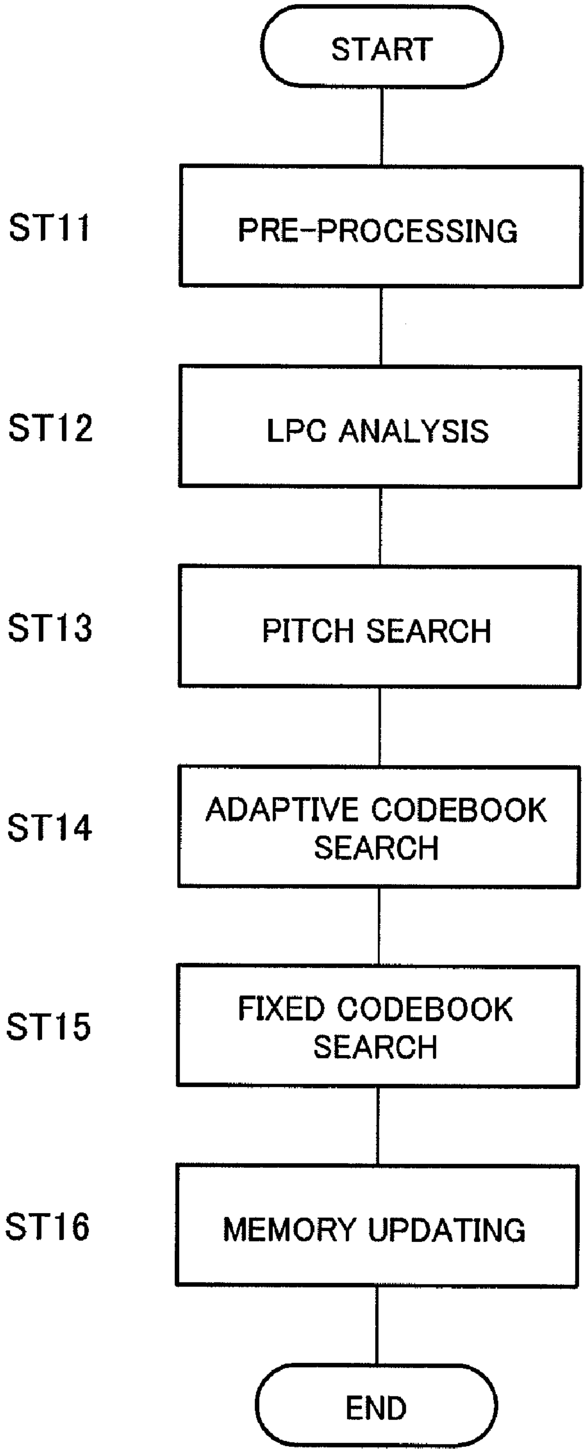
FIG. 2 shows a processing flow of speech coding according to Embodiment 1 of the present invention.

FIG. 2 shows the main processing flow of speech coding according to this embodiment.

First, in ST (step) 11, a stereo signal is subjected to preprocessing including down-sampling and processing of applying a high-pass filter and pre-emphasis filter.

In ST12, LPC analysis is applied to the pre-processed signal to obtain LPC parameters for the L channel (left channel) and the R channel (right channel) of the stereo signal. These LPC parameters are converted to immittance spectrum pair (ISP) and vector quantized for each channel.

In ST13, an open loop pitch lag is estimated twice per frame for each channel.

In ST14, using this estimated pitch lag (estimated pitch lag), an adaptive codebook search is performed using a closed loop pitch searched around the estimated pitch lag for every subframe.

In ST15, the fixed codebook search with pulse apportionment can be applied using the adaptive codebook vector to obtain a fixed codebook vector for each channel.

In ST16, the filter memory and some sample data are updated for a computation of the next subframe.

The fixed codebook search with pulse apportionment is the same as what is shown in the above-described Non-Patent Document 1.

Figure 3:
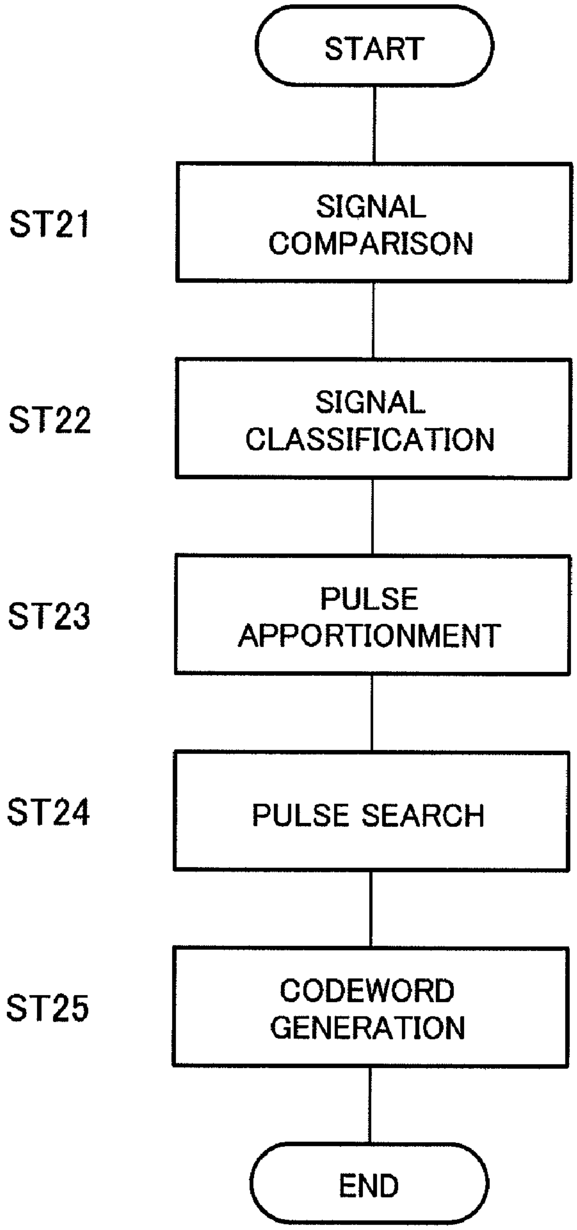
FIG. 3 shows a main processing flow of a fixed codebook search according to Embodiment 1 of the present invention.

Next, FIG. 3 shows the main processing flow of the fixed codebook search (ST15). The fixed codebook search (ST15) is mainly carried out through processing from ST21 to ST25.

In ST21, the L channel and the R channel of the stereo signal are compared for each subframe to determine the similarity of the signal characteristic between the two channels.

In ST22, the stereo signal is classified, and characteristic of the signal is determined.

In ST23, the required number of pulses is apportioned to the L channel and the R channel based on the similarity between the channels and characteristic of the stereo signal.

In ST24, a pulse search of AMR-WB speech coding is carried out, and pulse positions for each channel are determined.

In ST25, the pulses determined in ST24 are encoded as a set of codewords, and transmitted to a speech decoding apparatus as a codebook index which is one of parameters in the speech bitstream.

Figure 4:
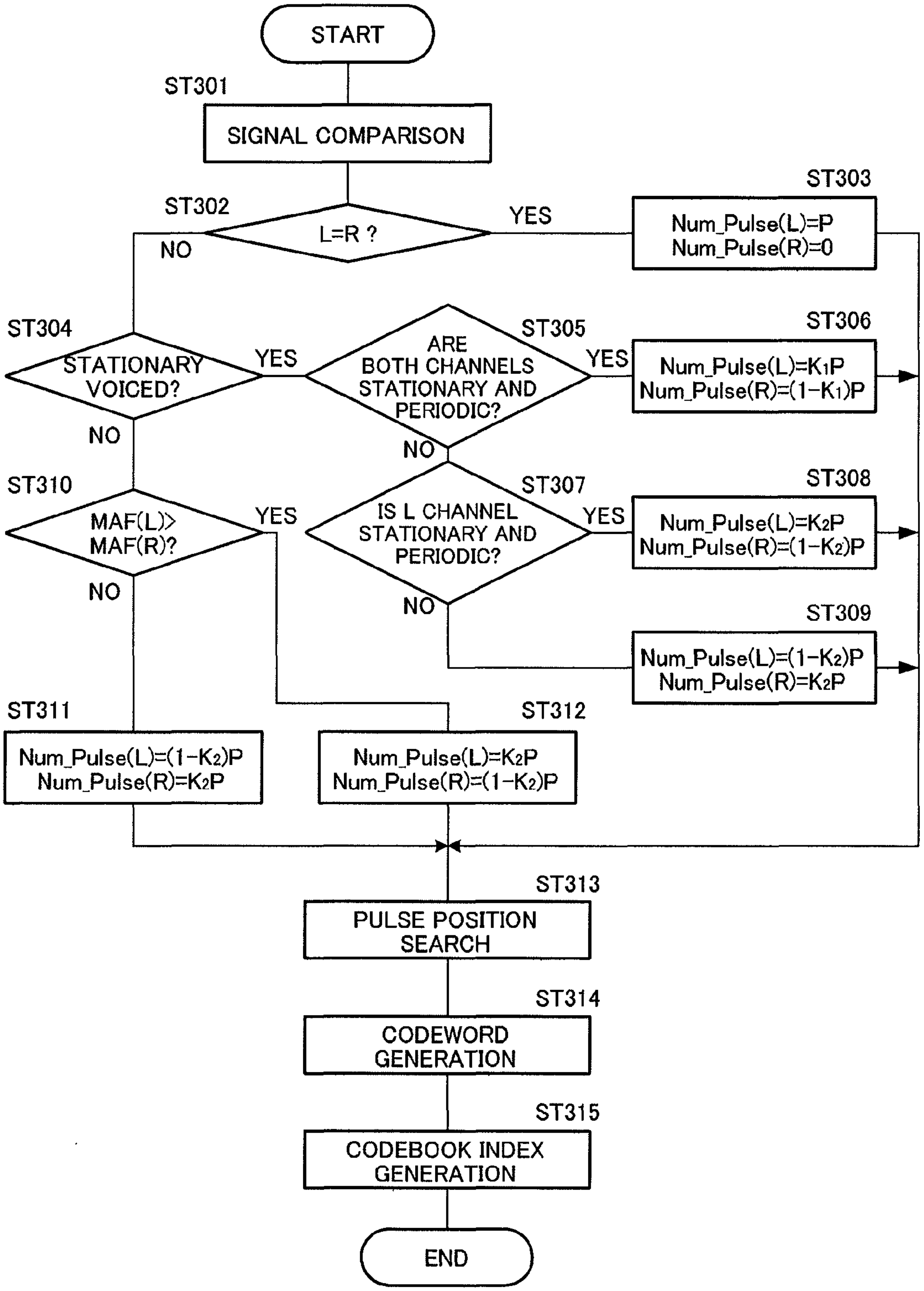
FIG. 4 shows a detailed processing flow of the fixed codebook search according to Embodiment 1 of the present invention.

Next, the processing flow shown in FIG. 3 will be described in detail using FIG. 4. Particularly, pulse apportionment (ST23) will be described in detail.

In ST301, the L channel and the R channel of each subframe are compared. Through this comparison, the similarity of the signal characteristic between the two channels (the degree of similarity between the two channels) is determined before the pulse apportionment or allocation process. In determination of the similarity, it is possible to utilize cross-correlation, comparison of signal envelopes in a time domain, comparison of spectrum signals or spectrum energies in a frequency domain, mid-side computation, and the like.

Figure 5:
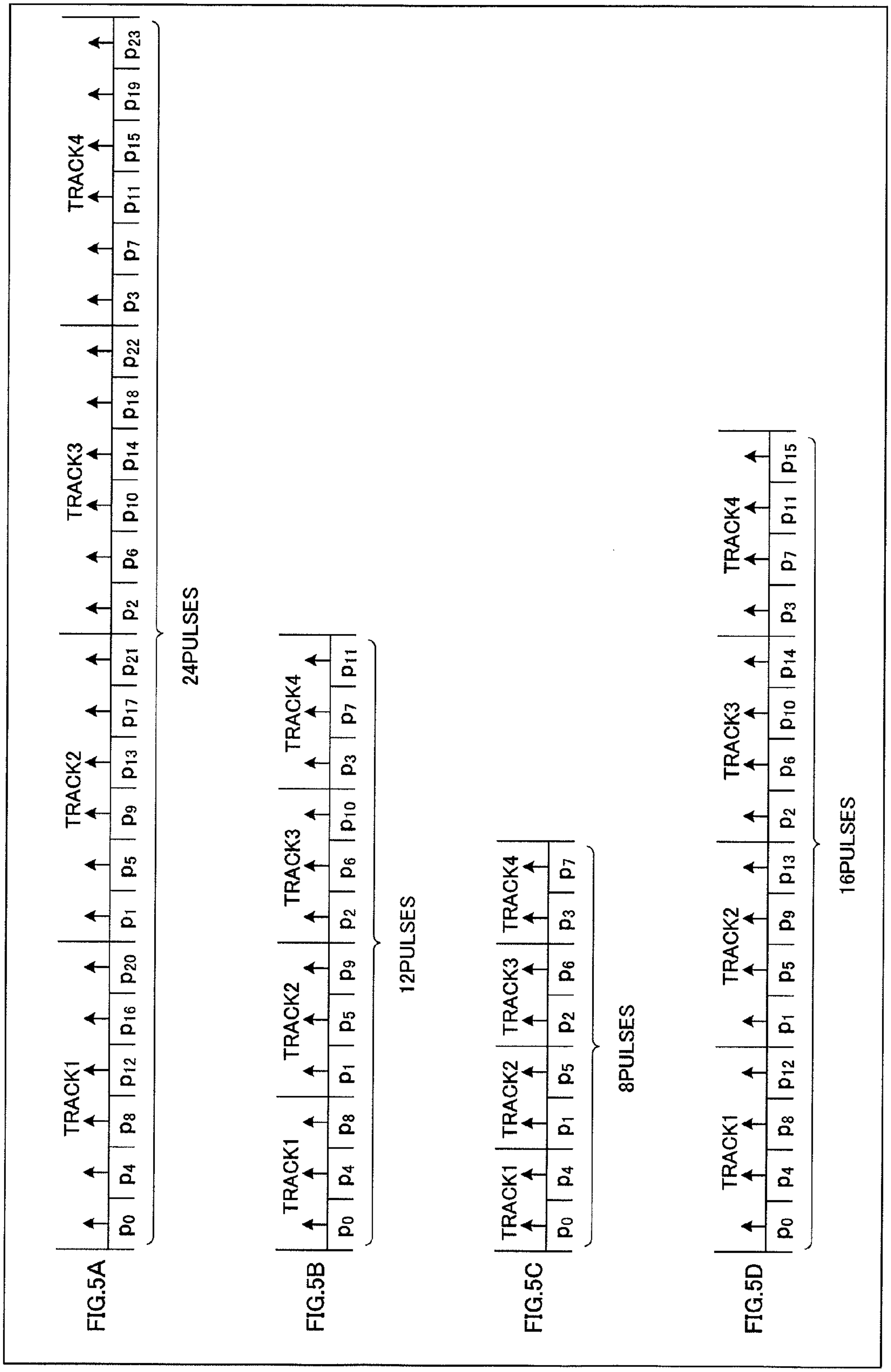
FIG. 5 shows an example of pulse apportionment according to Embodiment 1 of the present invention.
Figure 6:
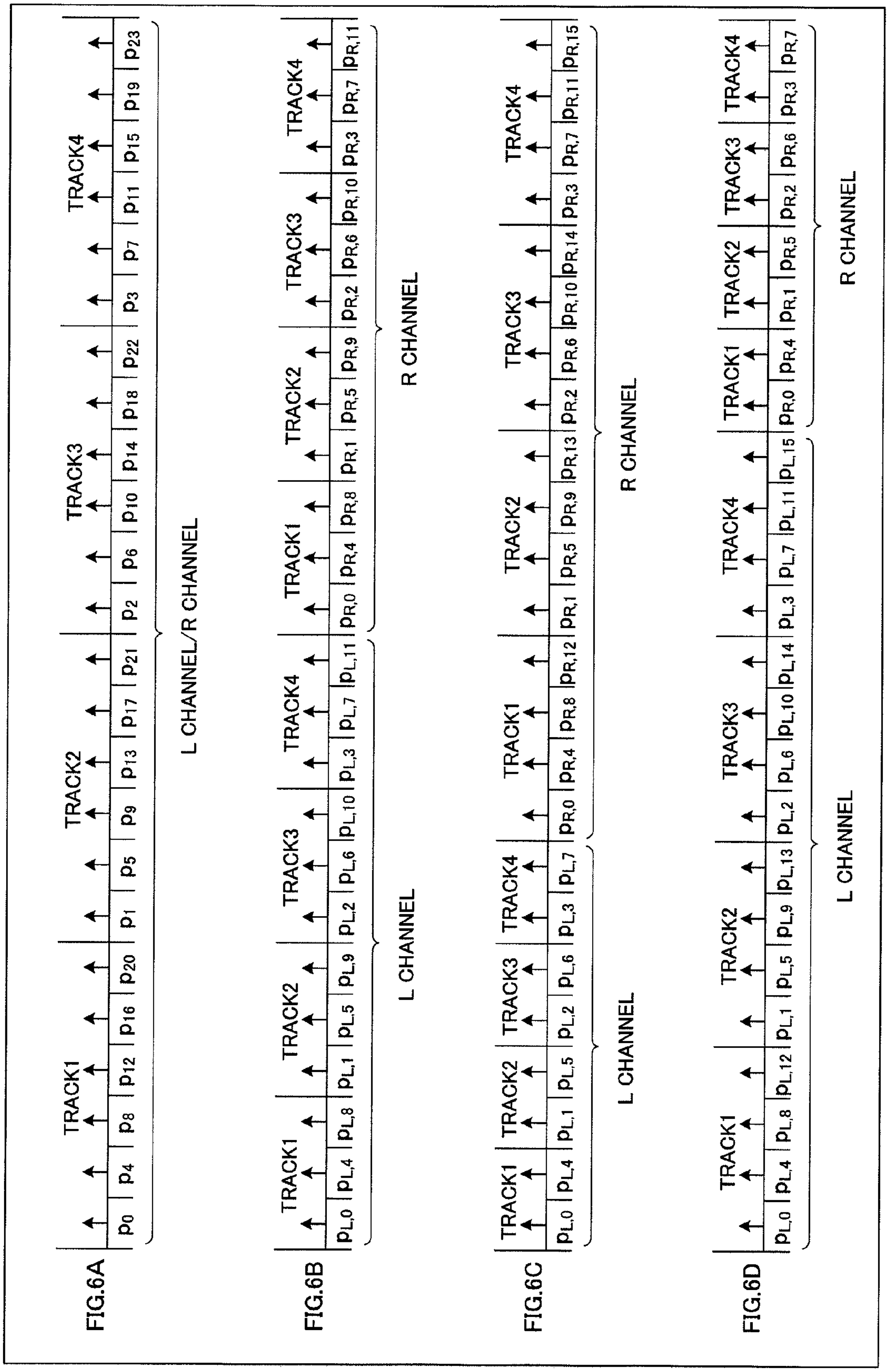
FIG. 6 shows another example of pulse apportionment according to Embodiment 1 of the present invention.

In ST302, if the L channel and the R channel are very similar (for example, if the cross-correlation value is larger than a threshold value) or if it is determined that the L channel and the R channel are identical (that is, if they are monaural signals), both channels will use a common set of pulses. That is, in ST303, the number of pulses for the L channel Num_Pulse (L) is set to P, and the number of pulses for the R channel Num_Pulse (R) is set to 0, or, inversely, the number of pulses for the L channel Num_Pulse (L) is set to 0, and the number of pulses for the R channel Num_Pulse (R) is set to P. For example, P is set to 24 in the case of AMR-WB speech coding mode 8. FIG. 5A shows a state where Num_Pulse is set in ST303. In this example, P=24. Twenty four pulses are all apportioned to either the L channel or the R channel, and therefore, as shown in FIG. 6A, a single common pulse set from $P_0$ to $P_{23}$ is used for both channels. The type of pulse apportionment shown in FIG. 6A is hereinafter referred to as "type 0".

In ST302, if the L channel and the R channel are dissimilar, (for example, if the cross-correlation value is less than the threshold value), in ST304, the classification of the signal is determined, and it is determined whether a "stationary voiced" signal is present in the L channel or the R channel. The signal of the L channel or R channel is classified as "stationary voiced" if it is periodic and stationary while the signal is classified as another type of signal if it is non-periodic or non-stationary signal. If either the L channel or the R channel is "stationary voiced", the flow proceeds to ST305, and if neither the L channel nor the R channel is "stationary voiced", the flow proceeds to ST310. In addition, when it is determined whether a signal is "stationary voiced" or not, it is possible to utilize a computation of an autocorrelation value using an autocorrelation method, a pitch prediction gain and an adaptive codebook gain. Further, it is possible to determine whether a signal is "stationary voiced" or not using an energy level, signal level, or the like of each channel.

In ST305, if it is determined that both the L channel and the R channel are classified as "stationary voiced" (stationary and periodic), both channels will have sets of pulses. That is, in such a case, in ST306, P pulses (P=24) will be distributed between the two channels so that the number of pulses for the L channel Num_Pulse (L) is set to $K_1P$ and the number of pulses for the R channel NUM_Pulse (R) is set to $(1-K_1)P$. An example value for $K_1$ is ½ which will apportion or allocate an equal number of pulses to both channels. FIG. 5B shows a state where Num_Pulse is set in ST306. Num_Pulse is set as shown in FIG. 5B, P=24 pulses are equally apportioned between both channels, and therefore Num_Pulse per channel is 12. Accordingly, as shown in FIG. 6B, different sets of pulses are used for each channel. However, the number of pulses included in each pulse set is equal (here, twelve pulses). The type of pulse apportionment shown in FIG. 6B is hereinafter referred to as "type 1".

In addition, in FIG. 6B, the pulses are indicated as $P_{ch,i}$ whereby the subscript ch is the channel which the pulse belongs to (the L channel or the R channel), and the subscript i is the pulse position. This is the same as in FIG. 6C and FIG. 6D.

In ST305, if it is determined that one of the channels is "stationary voiced," while the other channel is not "stationary voiced," the number of apportioned pulses P is not equal between the both channels. In this case, the number of pulses to be apportioned is determined based on which channel requires more pulses. Typically, fewer pulses are required by the "stationary voiced" channel, and thus fewer pulses will be apportioned to the "stationary voiced" channel. This is because, for the channel classified as "stationary voiced," an adaptive codebook can work effectively to produce an excitation signal, and therefore fewer pulses are required for the fixed codebook search.

That is, in ST307, if it is determined that the L channel is "stationary voiced" and the R channel is not "stationary voiced," fewer pulses are required by the L channel, and thus fewer pulses will be apportioned to the L channel compared to the R channel. That is, in ST308, P (P=24) pulses will be distributed to the L channel and the R channel so that the number of pulses for the L channel Num_Pulse (L) is set to $K_2P$ and the number of pulses for the R channel Num_Pulse (R) is set to $(1-K_2)P$. An example value for $K_2$ is ⅓. By this means, eight pulses are apportioned to the L channel, sixteen pulses are apportioned to the R channel, and fewer pulses are apportioned to the L channel compared to the R channel.

On the other hand, in ST307, if it is determined that the L channel is not "stationary voiced" type while the R channel is "stationary voiced," fewer pulses are apportioned to the R channel compared to the L channel. That is, in ST309, P (P=24) pulses will be distributed to the L channel and the R channel so that the number of pulses for the L channel Num_Pulse (L) is set to $(1-K_2)P$ and the number of pulses for the R channel Num_Pulse (R) is set to $K_2P$. An example value for $K_2$ is ⅓ as in the case described above. By this means, eight pulses are apportioned to the R channel, sixteen pulses are apportioned to the L channel, and fewer pulses are apportioned to the R channel compared to the L channel.

FIGS. 5C and 5D show a state where Num_Pulse is set in ST308 and ST309. An example value for $K_2$ is ⅓, and therefore Num_Pulse is 8 (FIG. 5C) and 16 (FIG. 5D). Therefore, as shown in FIGS. 6C and 6D, two different sets of pulses having the different numbers of pulses are used for each channel. The type of pulse apportionment shown in FIG. 6C is hereinafter referred to as "type 2", and the type of pulse apportionment shown in FIG. 6D is referred to as "type 3". In type 2, fewer pulses are apportioned to the L channel compared to the R channel, and, in type 3, fewer pulses are apportioned to the R channel compared to the L channel. In this way, in types 2 and 3, twenty four pulses are unequally distributed to the L channel and the R channel.

In ST304, if neither the L channel nor the R channel is "stationary voiced," the distribution of the pulses will have to depend on the maximum autocorrelation factor (MAF) of each channel. MAF is defined by equation 1. In equation 1, x(n) (n=0, . . . , N−1) is an input signal in a calculation target segment of MAF for a coding target subframe of the L channel or the R channel, N is a segment length of the calculation target segment (the number of samples), and τ is a delay. In addition, it is possible to use an LPC residual signal obtained using an LPC inverse filter in place of the input signal, as x(n).

[1]

$$C = \frac{\max\left\{\sum_{n=0}^{N-1} x(n)x(n-\tau)\right\}}{\sum_{n=0}^{N-1} x^2(n)} \quad (1)$$

If the MAF of the L channel is greater than the MAF of the R channel in ST310, in ST312, P (P=24) pulses will be distributed to the L channel and the R channel so that the number of pulses for the R channel Num_Pulse (R) is set to $K_2P$ and the number of pulses for the L channel Num_Pulse (L) is set to $(1-K_2)P$, as in ST308. An example value for $K_2$ is ⅓. Eight pulses are apportioned to the L channel, and sixteen pulses are apportioned to the R channel. That is, fewer pulses are apportioned to the L channel compared to the R channel. Therefore, the pulse apportionment type is type 2 (FIG. 6C).

On the other hand, if the MAF of the R channel is greater than the MAF of the L channel in ST310, in ST311, P (P=24) pulses will be distributed to the L channel and the R channel so that the number of pulses for the R channel Num_Pulse (R) is set to $K_2P$ and the number of pulses for the L channel Num_Pulse (L) is set to $(1-K_2)P$, as in ST308. An example value for $K_2$ is ⅓. Eight pulses are apportioned to the R channel, sixteen pulses are apportioned to the L channel. That is, fewer pulses are apportioned to the R channel compared to the L channel. Therefore, the pulse apportionment type is type 3 (FIG. 6D).

After the number of pulses apportioned to each channel is determined in ST303, ST306, ST308, ST309, ST311 and ST312, a pulse position is searched for each channel in ST313.

After the pulse positions of both the L channel and the R channel are searched, a set of codewords is generated using the pulses searched in ST314, and the codebook index for each channel is generated in ST315.

In addition, when neither the L channel nor the R channel is "stationary voiced" in ST304, the pulse apportionment can be determined so that an equal number of pulses is always apportioned to each channel, instead of being determined based on a MAF of each channel as described above.

Here, if the pulse apportionment uses the apportionment method for fixed $K_1$ and $K_2$, the number of pulses to be apportioned to each channel is uniquely determined according to four types (types 0 to 3) of the pulse apportionment, and therefore two bits are sufficient for reporting the number of pulses apportioned to each channel to the speech decoding side, as shown in FIG. 7. That is, to the speech decoding side, type 0 (when twenty four pulses are commonly apportioned to the L channel and the R channel) is reported as codeword "00", type 1 (when twelve pulses are apportioned to the L channel and the R channel) is reported as codeword "01", type 2 (when eight pulses are apportioned to the L channel, and sixteen pulses are apportioned to the R channel) is reported as codeword "10", type 3 (when sixteen pulses are apportioned to the L channel, and eight pulses are apportioned to the R channel) is reported as codeword "11".

Figure 8:
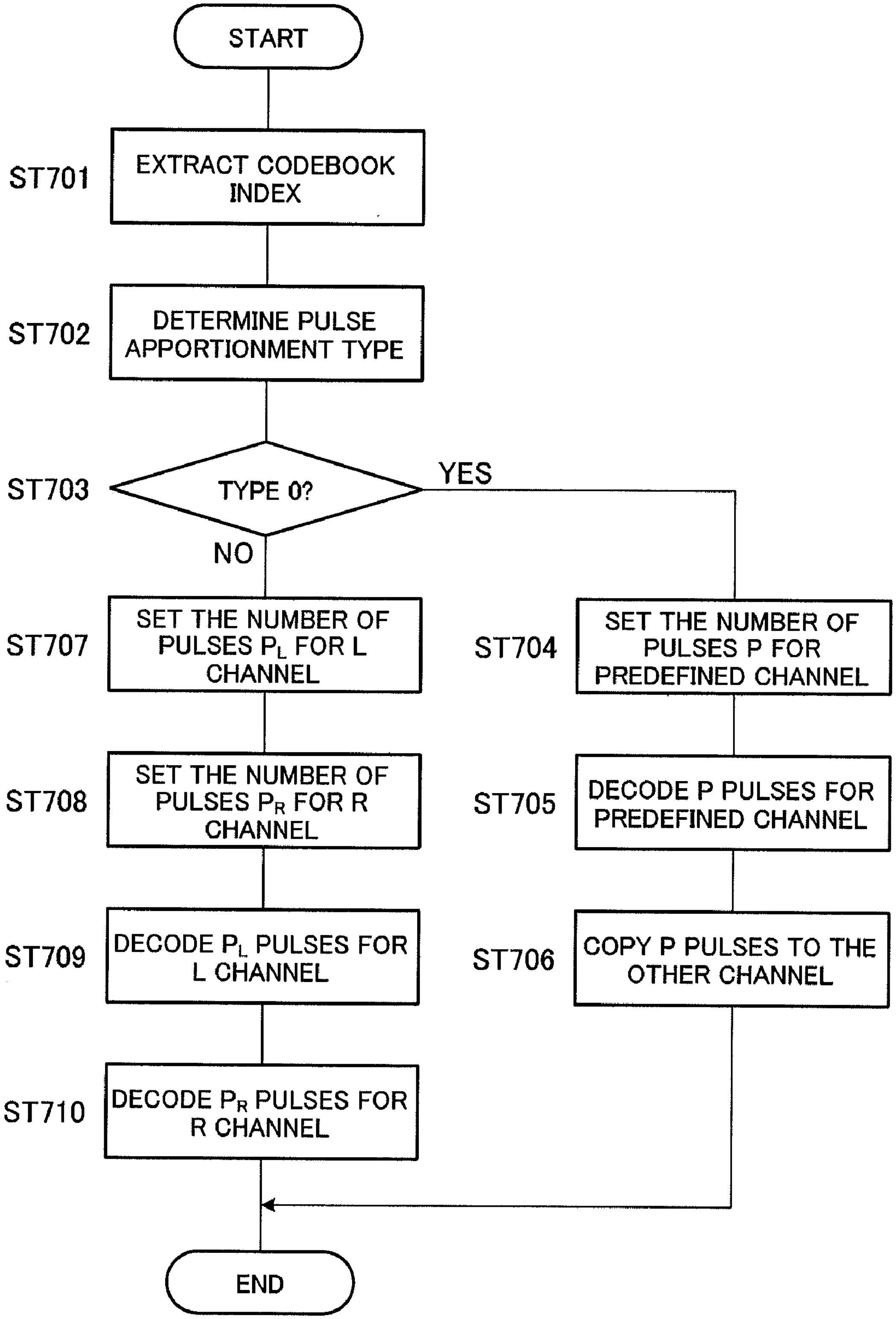
FIG. 8 shows a processing flow of speech decoding according to Embodiment 1 of the present invention.

FIG. 8 shows a processing flow on the speech decoding side.

In ST701, the codebook index which is the quantized form of pulse data is extracted from a bitstream. Further, the above-described two-bit information indicating the type of pulse apportionment is extracted from the bitstream.

In ST702, the type of pulse apportionment is determined based on the two-bit information extracted from the bitstream with reference to the table shown in FIG. 7.

In ST703, if the type of pulse apportionment is type 0, the flow proceeds to ST704, and if the type is types 1 to 3, the flow proceeds to ST707.

If the type of pulse apportionment is type 0, both channels use the same codebook. That is, in ST704, P=24 pulses will be all apportioned to one channel determined in advance (a predefined channel), and, in ST705, P=24 pulses for the predefined channel are decoded. In ST706, the pulses decoded in ST705 are then copied to the other channel.

On the other hand, if the type of pulse apportionment is types 1 to 3, the number of pulses for each channel is set according to the type. That is, if type 1 is detected, twelve pulses are set to the L channel and the R channel, respectively, if type 2 is detected, eight pulses are set to the L channel and sixteen pulses are set to the R channel, and, if type 3 is detected, sixteen pulses are set to the L channel and eight pulses are set to the R channel.

Here, it is assumed that the predefined channel is the L channel. The number of pulses $P_L$ for the L channel is set in ST707, and the number of pulses $P_R$ for the R channel is set in ST708. $P_L$ pulses are decoded as the codebook data for the L channel in ST709, and $P_R$ pulses are decoded as the codebook data for the R channel in ST710.

In addition, when the predefined channel is the R channel, the order of the processing flow is ST708, ST707, ST710 and ST709.

In this way, according to this embodiment, the number of pulses to be apportioned is determined based on the similarity between the channels and characteristic (the periodicity and the degree of stationarity) of each channel. Therefore, it is possible to apportion the optimum number of pulses to each channel.

Embodiment 2

In this embodiment, $K_1$ and $K_2$ are determined based on the characteristic of the speech signal, and the pulse apportionment between the channels is adaptively changed. The pulse apportionment ratio between the channels can be obtained based on the periodicity and the MAF of the speech signal of each channel.

For example, if both the L channel and the R channel are "stationary voiced," $K_1$ is obtained from equation 2.

[2]

$$K_1 = \alpha_1 \frac{\tau_R}{\tau_L + \tau_R} \tag{2}$$

In equation 2, $\tau_L$ and $\tau_R$ are a pitch period of the L channel and a pitch period of the R channel, respectively, and $\alpha_1$ is a coefficient for fine adjustment of $K_1$. According to equation 2, it is possible to apportion more pulses to the channel which has the shorter pitch period, that is, the channel which has the higher pitch frequency.

Further, if one channel is "stationary voiced" while the other channel is not, $K_2$ is obtained from equation 3.

[3]

$$K_2 = \beta + \alpha_2 \frac{C_{uv}}{C_L + C_R} \tag{3}$$

In equation 3, $C_{uv}$ is the MAF of the channel which is not "stationary voiced", $C_L$ and $C_R$ are a MAF of the L channel and a MAF of the R channel, respectively, and $\alpha_2$ is a coefficient for fine adjustment of $K_2$. According to equation 3, it is possible to apportion fewer pulses to the channel which is classified as "stationary voiced".

In addition, in equation 3, $\beta$ is a parameter for ensuring that the "stationary voiced" channel has a minimum number of pulses, and defined by equation 4.

[4]

$$\beta = \text{ceiling}\left(\frac{L}{\tau_{ch}}\right) \times \frac{1}{P} \tag{4}$$

In equation 4, L is the number of samples in a frame, $\tau_{ch}$ is the pitch period of the "stationary voiced" channel, and P is the total number of pulses in a subframe. Ratio $L/\tau_{ch}$ basically computes the number of periods in a frame. For example, a value of 256 for L and 77 for $\tau_{ch}$ will produce a result of ratio $L/\tau_{ch}$ (the number of periods in a frame) of 4. By this means, there is at least one pulse in each pitch period.

The values of $K_1$ and $K_2$ obtained according to equations 2 to 4 are used to determine the number of pulses to be apportioned to the L channel and the R channel. The pulses apportioned to the L channel and the R channel can be minimum value MIN_PULSE and maximum value MAX_PULSE that fulfill the condition of equations 5 and 6.

[5]

$$\text{MIN\_PULSE} \leqq \text{Num\_Pulse(channel)} \leqq \text{MAX\_PULSE} \tag{5}$$

[6]

$$\text{Num\_Pulse}(L) + \text{Num\_Pulse}(R) = \text{TOTAL\_PULSE} \tag{6}$$

In equations 5 and 6, MIN_PULSE and MAX_PULSE are the minimum and maximum numbers of pulses that can be apportioned to a particular channel per subframe, and TOTAL_PULSE is the total number of pulses that can be apportioned to both channels per subframe. Typical values of MIN_PULSE, MAX_PULSE and TOTAL_PULSE are 4, 20 and 24, respectively. The computed number of pulses may be rounded to the nearest multiple of 1, 2 or 4.

When the number of pulses apportioned to each channel is adaptively changed, it is necessary to report the number of pulses apportioned to each channel to the speech decoding side. However, the number of pulses apportioned to one channel can be derived by subtracting the number of pulses apportioned to the other channel from the total number of pulses of both channels, and therefore either one channel is determined as a predefined channel, and it is only necessary to report the number of pulses apportioned to the predefined channel. For example, if the L channel is set as the predefined channel, the number of pulses for the L channel Num_Pulse (L) is reported, and the number of pulses for the R channel Num_Pulse (R) is obtained from equation 7.

[7]

$$\text{Num\_Pulse}(R) = \text{TOTAL\_PULSE} - \text{Num\_Pulse}(L) \tag{7}$$

A method of reporting the number of pulses for the predefined channel is described as follows.

If the number of pulses for each channel is a multiple of 4, there are five possibilities as 4, 8, 12, 16 and 20. In such a case, only three bits are required to classify the number of pulses of these five possibilities. If the number of pulses for each channel is a multiple of 2, there are nine possibilities as 4, 6, 8, 10, 12, 14, 16, 18 and 20. In such a case, four bits are required to classify the number of pulses of these nine possibilities. However, if the number of pulses for each channel is in steps of one pulse from four to twenty pulses, five bits will be required to classify the number of pulses of the seventeen possibilities. These numbers of pulses can be in the form of the table shown in FIG. 9. On the speech encoding side, the number of pulses is converted to codewords of three to five bits with reference to this table, and the codewords are reported. On the speech decoding side, with reference to this table in the same way, the number of pulses apportioned to each channel is derived from the reported codewords.

Figure 10:
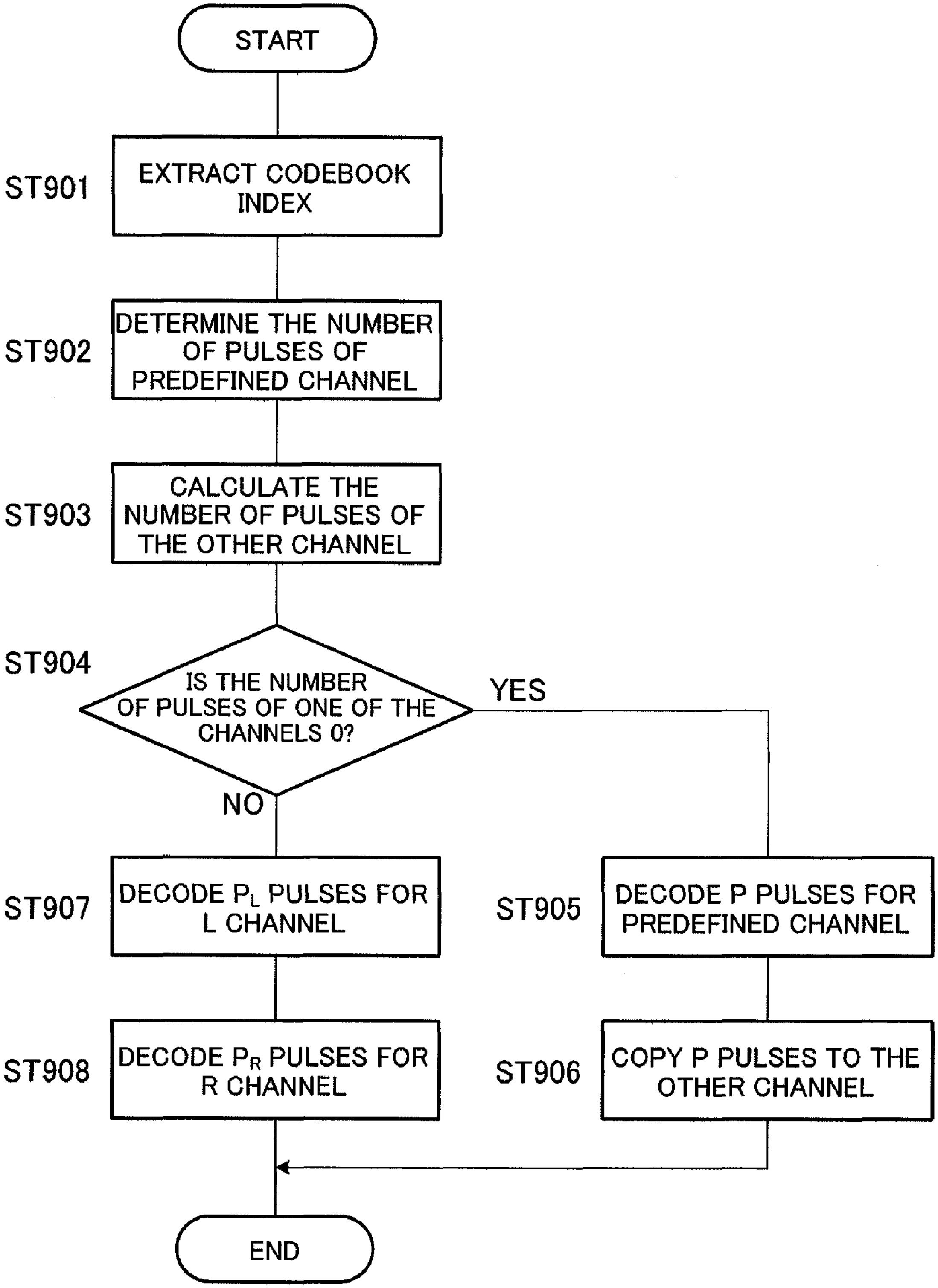
FIG. 10 shows a processing flow of speech decoding according to Embodiment 2 of the present invention.

FIG. 10 shows a processing flow on the speech decoding side.

In ST901, the codebook index which is a quantized form of the pulse data is extracted from the bitstream. Further, the codewords (three to five bits) indicating the number of pulses are extracted from the bitstream.

In ST902, the number of pulses for the predefined channel is determined based on the codewords indicating the number of pulses with reference to the table shown in the above FIG. 9. Here, the predefined channel is assumed to be the L channel.

In ST903, the number of pulses for the other channel—the R channel—is calculated according to equation 7.

In ST904, if it is detected that one of the channels has zero pulse, the flow proceeds to ST905, and, in other cases, the flow proceeds to ST907.

If it is detected that one of the channels has zero pulse, both channels use the same codebook. That is, in ST905, all P=24 pulses are set for the predefined channel, and P=24 pulses are decoded for the predefined channel. In ST906, the pulses decoded in ST905 are copied to the other channel.

On the other hand, in ST907, the number of pulses $P_L$ for the L channel (predefined channel) is set with reference to the table shown in the above FIG. 9, and $P_L$ pulses are decoded as codebook data for the L channel. In ST908, the number of pulses $P_R$ or the R channel is set according to equation 7, and $P_R$ pulses are decoded as codebook data for the R channel.

If the predefined channel is the R channel, the order of the processing flow is ST908 and ST907.

In this way, according to this embodiment, $K_1$ and $K_2$ are determined based on the characteristic of the speech signal, and the pulse apportionment between the channels is adaptively changed, so that it is possible to distribute the numbers of pulses between the channels more flexibly and accurately.

In the above-described embodiments, the case has been described where the total number of pulses apportioned to the channels is fixed (in the above-described embodiments, fixed at P=24), but the total number of pulses apportioned to the channels may be changed according to the similarity between the channels and the characteristic (the periodicity and the degree of stationarity) of each channel. For example, in Embodiment 1, if the pulse apportionment type is "type 0", that is, if the L channel and the R channel are very similar (for example, if the cross-correlation value is larger than a threshold value), or if the L channel and the R channel are identical (that is, they are monaural signals), fewer pulses may be apportioned to either the R channel or the L channel than the total number of pulses apportioned in other types (in the above-described embodiments, P=24). By this means, it is possible to further improve transmission efficiency.

Furthermore, the processing flow according to the above-described embodiments can be implemented in the speech encoding apparatus and speech decoding apparatus. Further, the speech encoding apparatus and speech decoding apparatus can be provided to radio communication apparatuses such as radio communication mobile station apparatuses and radio communication base station apparatuses used in the mobile communication system.

The processing flow according to the above-described embodiments may typically be implemented as an LSI constituted by an integrated circuit. These may be individual chips or partially or totally contained on a single chip.

"LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application in biotechnology is also possible.

The present application is based on Japanese Patent Application No. 2005-034984, filed on Feb. 10, 2005, entire content of which is expressly incorporated by reference herein.

INDUSTRIAL APPLICABILITY

The present invention can be applied to communication apparatuses in mobile communication systems and packet communication systems in which internet protocol is used.

The invention claimed is:

1. A pulse apportionment method in a fixed codebook search in speech coding for a stereo speech signal, comprising:

using a comparator, comparing a right channel signal and a left channel signal of the stereo speech signal to determine a similarity between the right channel signal and the left channel signal; and using a determiner, determining a number of pulses to apportion to the right channel signal and to the left channel signal according to characteristics of the left channel signal and the right channel signal, and the similarity between the left channel signal and the right channel signal.

2. The pulse apportionment method according to claim 1, wherein, when the similarity is equal to or larger than a threshold value, all pulses are apportioned to one of the right channel signal and the left channel signal.

3. The pulse apportionment method according to claim 1, wherein the characteristics of the left channel signal and the right channel signal are determined based on at least one of a degree of stationarity, periodicity and maximum autocorrelation factor of each the left channel signal and the right channel signal.

4. The pulse apportionment method according to claim 3, wherein fewer pulses are apportioned to a channel signal having a larger degree of stationarity, periodicity and maximum autocorrelation factor.

5. The pulse apportionment method according to claim 1, wherein, when characteristics of the right channel signal and the left channel signal are identical, an equal number of pulses is apportioned to each channel signal.

6. The pulse apportionment method according to claim 1, wherein a codeword indicating the number of pulses apportioned to each channel is reported to a speech decoder.

* * * * *